United States Patent [19]

Eggenmueller

[11] Patent Number: 5,070,683
[45] Date of Patent: * Dec. 10, 1991

[54] METHOD AND APPARATUS FOR MULCHING OF GRASS, LEAFAGE, OR SIMILAR MATERIAL

[76] Inventor: Alfred Eggenmueller, Schuetzenweg 10, 7915 Elchingen, Fed. Rep. of Germany

[*] Notice: The portion of the term of this patent subsequent to Jan. 22, 2008 has been disclaimed.

[21] Appl. No.: 592,949

[22] Filed: Oct. 4, 1990

[30] Foreign Application Priority Data

Oct. 10, 1989 [DE] Fed. Rep. of Germany ....... 3933818
Jan. 9, 1990 [DE] Fed. Rep. of Germany ....... 4000352
Aug. 25, 1990 [DE] Fed. Rep. of Germany ....... 4026930

[51] Int. Cl.[5] ............................................. A01D 34/70
[52] U.S. Cl. .................................... 56/13.8; 56/16.6; 56/202
[58] Field of Search .................. 56/1, 13.6, 13.7, 13.8, 56/13.9, 14.3, 16.9, 202, 203, 206, DIG. 5, 16.4, 16.6

[56] References Cited

U.S. PATENT DOCUMENTS

| D. 227,286 | 6/1973 | Thorud | D15/17 |
|---|---|---|---|
| D. 227,388 | 6/1973 | Thorud | D15/17 |
| D. 228,009 | 7/1973 | Thorud | D15/17 |
| 2,809,488 | 10/1957 | Sewell | 56/13.8 |
| 2,975,578 | 3/1961 | Drauder et al. | 56/13.8 |
| 3,058,284 | 10/1962 | Anderson | 56/13.9 X |
| 3,808,627 | 5/1974 | Doering et al. | |
| 3,846,963 | 11/1974 | Pedigo | |
| 3,974,629 | 8/1976 | Russell et al. | 56/13.7 |
| 4,283,904 | 8/1981 | Aron | 56/13.9 |
| 4,711,074 | 12/1987 | Jetzinger | 56/13.6 |
| 4,916,887 | 4/1990 | Mullet et al. | 56/13.8 |

FOREIGN PATENT DOCUMENTS

2831011 1/1980 Fed. Rep. of Germany .
3048364C2 7/1982 Fed. Rep. of Germany .

Primary Examiner—William P. Neuder
Attorney, Agent, or Firm—Lowe, Price, LeBlanc & Becker

[57] ABSTRACT

A method and apparatus for mulching grass, leafage, or similar material using a unitary apparatus which cuts and/or collects said material, comminutes, compacts, and conveys said material for broadly spreading thereof on the ground of lawn.

22 Claims, 7 Drawing Sheets

METHOD AND APPARATUS FOR MULCHING OF GRASS, LEAFAGE, OR SIMILAR MATERIAL

FIELD OF THE INVENTION

The invention relates to a method and an apparatus for mulching of grass, in particular cut grass resulting from lawn mowing. There is provided a mower/collector for mowing and/or collecting the grass or the leafage which is then comminuted and pressed and finally deposited on the ground.

TECHNICAL BACKGROUND

U.S. Pat. No. 3,846,963 discloses a lawn mower having attached thereto an appliance comprising a feeding-worm transporting the clipped grass to a cutting device for further comminuting the grass which is then disposed to the ground through an extrusion plate. With this apparatus the clipped material will in the essence just be shortened with little compacting involved. With such tender treatment the rotting process of the clipped lawn will not be much improved as compared with material disposed untreated. Furthermore, depositing of the clipped grass onto the ground or lawn is done in the form of a material string of a width of only a few centimetres causing heavy material concentrations as compared with the operating width of the lawn mower of about 1 m which concentrations are detrimental to a fast rotting of the material. Also, the power for driving such an appliance is relatively high since all the material will have to be pressed through the relatively narrow holes of the extrusion plate. These holes will frequently be blocked by collected stones which requires an increased driving power and jeopardize the operating safety.

German Patent Laid Open Publications Nos. 30 48 364 and 28 31 011 disclose apparatuses for treating lawn with the clipped grass being collected from the ground comminuted and compacted and eventually deposited on the ground. The compacting devices used to have the form of a worm press or crushing rollers, respectively, which have a complex design and require a high driving power due to the extrusion plate used with these apparatuses as well. Furthermore, in contrast to the apparatus of the first-mentioned publication the compacting devices of these apparatuses are not arranged closely to the mowing device but connected thereto by a suction unit. For collecting the clipped grass a collecting container is provided in which a compacting device is rotating. The grass fed by means of the suction unit is rather loosely and consumes a lot of space in the collecting container since it is not compacted. Therefore, for temporary storing of the clipped material a large container is necessary provided that such a temporary storing is feasible at all. Rather, the compacting device must be continuously operating in order to prevent chocking of the material.

Furthermore, as a spreading means there is arranged below the compacting device a rotating disc formed as centrifugal disc. Therefore, very little grass will be deposited in the central region of the operating width whilst much compacted material will be deposited in the lateral regions, specifically in the lawn area not yet mown.

The present invention is an improvement of the apparatus and method according to my related patent U.S. Pat. No. 4,986,063.

SUMMARY OF THE INVENTION

It is an object of the present invention to provide a method and an apparatus for mulching grass or leafage with improved faster rotting and more uniform distributing thereof on the ground.

It is another object of the invention to provide a method and an apparatus for mulching grass or leafage or the like materials having a simpler design and requiring less power.

It is a still further object of the present invention to provide a method and an apparatus for mulching grass or leafage or the like materials ensuring high operating safety.

According to the invention there is provided a method of mulching grass, leafage, or similar material with a unitary apparatus comprising the steps cutting-/collecting said material; combined comminuting, compacting, and conveying said material; and broadly spreading said material essentially uniformly.

According to another aspect of the invention there is provided an apparatus for mulching grass, leafage, or similar material comprising a mowing/collecting means having mowing/collecting members rotatable about an axis; a combined comminuting, compacting, and conveying means including a tine rotor means having tines engaging a pressing wall arranged in opposition thereto; and spreading means connected to an outlet of said combined comminuting, compacting, and conveying means for loosely, broadly, and essentially uniformly spreading said material.

With the method and, respectively, the apparatus of the invention the clipped or collected material is considerably comminuted by chopping and crushing in the pressing device and is then uniformly distributed over the operating width of the apparatus on the ground or the lawn, respectively. In contrast to long and heavy clipped grass or collected leafage the light and heavily compacted material drops in between the clipped lawn. Due to the contact with the ground, the ground bacteria important for a fast rotting of the material have easy access to the strongly comminuted grass or leafage material with the surfaces of the grass or leafage damaged by intensive comminuting and crushing offering easy access for the bacteria and the environment. Due to the high compacting in the comminuting and pressing device, the cell water of the grass or leafage is squeezed out; this enhances the rotting process as well. By a relatively uniform spreading or distribution over the total operating width of the lawn mower or the collecting apparatus there is a broad and uniform distribution of the material such that a broad coverage and supply of nutriments for the ground is achieved in a sense of an effective mulching procedure. A throwing away of the comminuted and compacted material beyond the operating width, for instance onto unmown lawn areas or walkways is avoided by the lateral limitations of the distributing knee or the mower housing.

The proposed deflection of comminuted and compacted grass or leafage material back into the mowing or collecting device results in particularly uniform spreading or distribution of the material by means of the rotating tools arranged there. Furthermore, the feed back of the comminuted and compacted material through a deflection channel enables the omission of a separate spreading device such that the design of the apparatus is simple and space-saving.

According to a further feature of the invention the comminuted and compacted material is fed as a first partial stream into a container and is collected there with a high amount of densification whilst a second partial stream of material is fed back for spreading on the ground in a spreading device. Specifically, with high grass and consequently large amount of grass or leafage material this results in a mulching only of that portion fed back and sufficiently small as to be properly received by the ground or the lawn. Therefore, a mulching is possible dependent on the height of the lawn with excessive amounts of grass or leafage material collected in a heavily compacted and space-saving form in a container. Preferably, the portions of the collected partial stream and that partial stream spreaded on the lawn is continuously variable such that the degree of mulching may be adapted to the momentary lawn height. For this purpose there is the possibility first to collect all the comminuted and compacted grass or leafage material in a container and then feeding back all or part of the material from the container for uniform spreading onto the ground.

The apparatus according to the invention for mulching grass or leafage material features an intensive comminuting and compacting of the material such that the latter may be easily spread on the ground surface. A plurality of chopping surfaces at the grass or the leafage ensure a fast rotting thereof. With a preferred embodiment the comminuting and pressing device is designed as a tine rotor provided with rigid tines periodically projecting into a pressing channel with grooves being provided for intensive comminuting through which the tines pass during their rotation and chop, crush, and press the grass or leafage material offering enlarged surfaces to be accessed by bacteria for later rotting. Such type of tine rotor has a rather compact design with a low requirement for driving power and low danger for damages by stones or similar foreign bodies. Thus, a very high operating safety is achieved even with stony grounds.

The spreading for broadly spreading the comminuted grass or leafage material is formed in its simplest design by a steeply upwardly inclined knee having a conically expanding cross-section ending in an outlet opening. Upon feeding the comminuting material upward into this conically expanded knee it broadens laterally and upon passing the highest position in the knee drops slowly down over the whole operating width and is thus distributed broadly onto the lawn surface. For high requirements of the distribution uniformity, the spreading device may be formed as a driven spreading or distributing drum.

It is of a particular advantage to feed back the comminuted and compacted grass or leafage material into the mowing or collecting device since the tools rotating therein provide the spreading of the grass or leafage material. For this purpose there is provided after the comminuting and compacting device a deflecting channel preferably including a deflecting element, in particular a deflecting lid or a deflecting bend for selectively adjusting the amount of grass or leafage material to be fed back between 0 and 100% such that the portion of the material spread on the ground related to the mown or collected material may be variably adjusted to the momentary situation as height of the grass and ground conditions. The lateral walls of the mower housing ensure a proper spreading width of the material to be mulched approximately to the operating width of the lawn mower. As a whole, there is achieved a very compact apparatus not remarkably larger in size than usual lawn mowers.

Further features and advantages of the method and apparatus of the invention are subjects of the subclaims and the following description with reference to the drawings.

BEST MODE OF CARRYING OUT THE INVENTION

Figure 1:
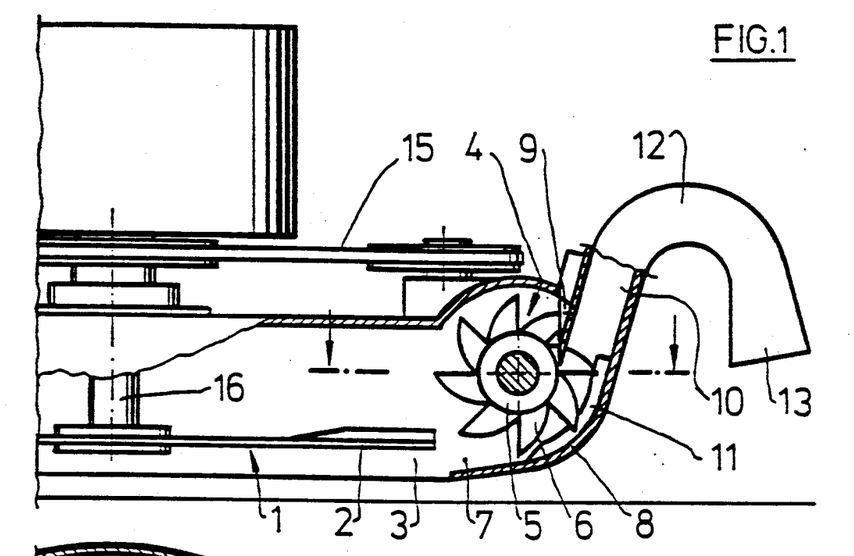
FIG. 1 is an elevational view of a first embodiment of an apparatus according to the invention comprising a lawn mower provided with a comminuting and compacting device as well as a spreading device.
Figure 2:
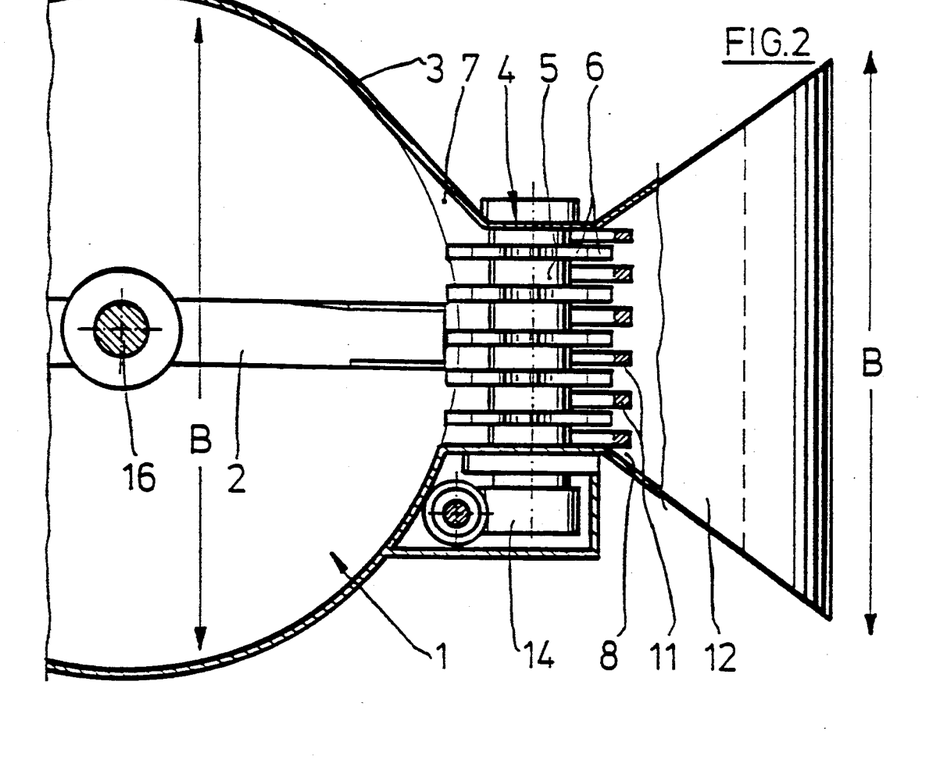
FIG. 2 is a schematic sectional plan view of the apparatus of FIG. 1.

According to FIGS. 1 and 2 a first embodiment of the invention comprises a lawn mower including a mowing device 1 having a sickle knife 2 rotatably arranged in a housing 3. The mowing device 1 moves to the left (FIGS. 1 and 2) mowing a lawn over a width B. It should be noted that instead of a lawn mowing device the apparatus of the invention may comprise, for example, a rotating pick-up drum as well. To the mowing device 1 a comminuting and compacting device 4 is connected essentially comprising a tine rotor 5 provided with rigid tines 6. Specifically, the comminuting and compacting device 4 is directly and closely connected to the mowing device 1 such that through an entering region 7 the mown stalk or leafage material is fed into the operating region of the tines 6 urging it through a press passage 8 and a comb-type strip-off element 9 into a pressing channel 10. Thus, the grass or leafage is urged through the rigid tines 6 into longitudinal grooves 11 with the grass or leafage being chopped and smashed. When being fed into the pressing channel 10 the material is further pressed together such that humidity is squeezed out of the grass or leafage.

It should be noted that the principle construction of the mowing or collecting device 1 and of the comminuting and compacting device 4 according to the following Figures is essentially the same; thus, for the following embodiments elements 1 to 11 are designated with corresponding reference numerals plus 20 in order to facilitate understanding.

A collecting device as exemplarily disclosed in U.S. Pat. No. 3,808,627 using a rotary brush may be used as well.

With the embodiment according to FIGS. 1 and 2 the pressed material enters a knee 12 steeply inclined upward and conically expanding to the end thereof with the comminuted and compacted material being urged to the lateral surfaces of the knee 12 and being loosely dropped to the ground. This results in a distributed spreading in lateral width B such that upon passing the highest point of the knee 12 the comminuted material is essentially uniformly spread over the operating width B downward through an outlet 13 whereafter the material drops onto the lawn or ground.

It should be noted that the tine rotor 5 is driven by a wormdrive 14 which in turn is driven via a belt drive 15 from the knife shaft with an axis 16 of the mowing device 1.

Figure 3:
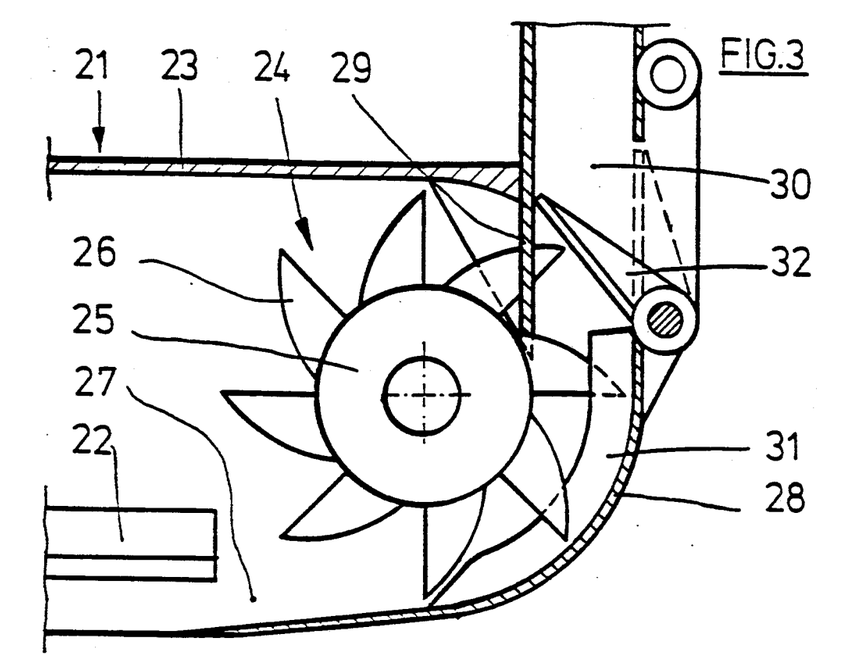
FIG. 3 is a schematic elevational view in section illustrating the comminuting and compacting device of the apparatus of FIG. 1 with a modified spreading device.
Figure 7:
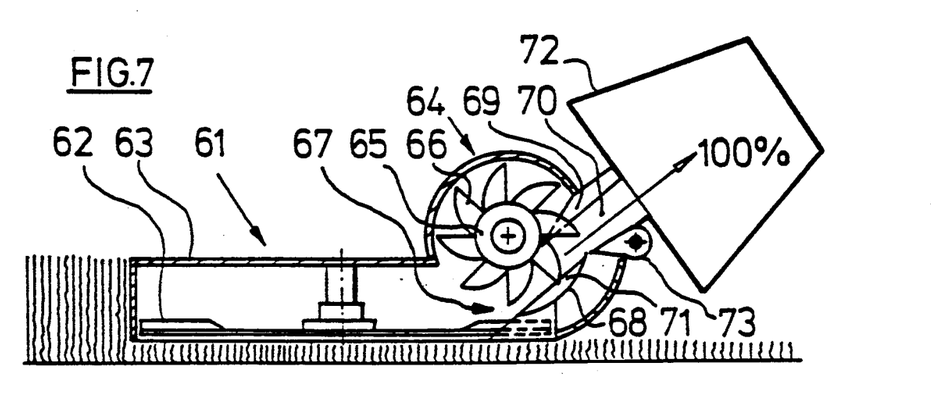
FIGS. 7-9 illustrate a third embodiment of the apparatus according to the invention in operation under three different conditions.
Figure 8:
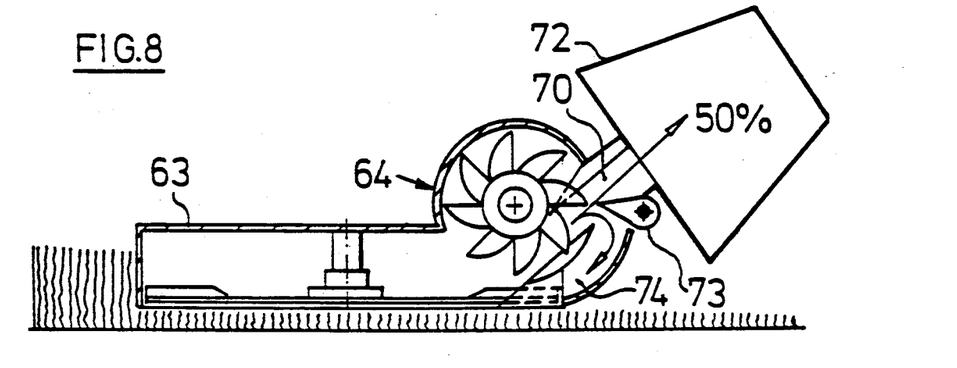
Figure 9:
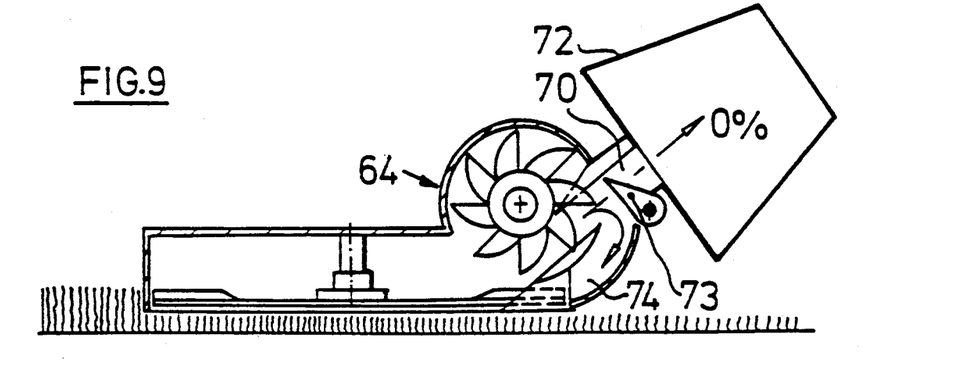

FIG. 3 illustrates a similar comminuting and compacting device 24 in the rear region behind a mowing device 21 using rotating tools or knives 22. A tine rotor 25 feeds the grass or leafage thrown away by the rotating knife 22 through an entering region 27 by means of rigid tines 26 along a pressing wall 28 through grooves 31 to a pressing channel 30. At this pressing channel 30 there may be provided a distributing or spreading device similar to the spreading or distributing device 12 of FIG. 1 or a collecting container as illustrated in FIGS. 7 to 9 and explained later on. From changing the operation from pressing the material through the pressing channel 30 into a container to an operation effecting direct disposal of the comminuted and compacted material onto the ground the pressing channel 30 is provided with a deflecting element 32, which for the present embodiment comprises a pivotal wall element which after having been pivoted from the vertical position illustrated in dashed lines into the position shown in full lines forces the compacted material through a comb-type strip-off element 29 to be fed back into the upper region of a housing 23. It should be noted that the material is further comminuted when passing through the comb-type strip-off element 29 such that it falls back onto the rotating knife 22 in an almost powderized form such that it is widely distributed over the operating width B.

Figure 4:
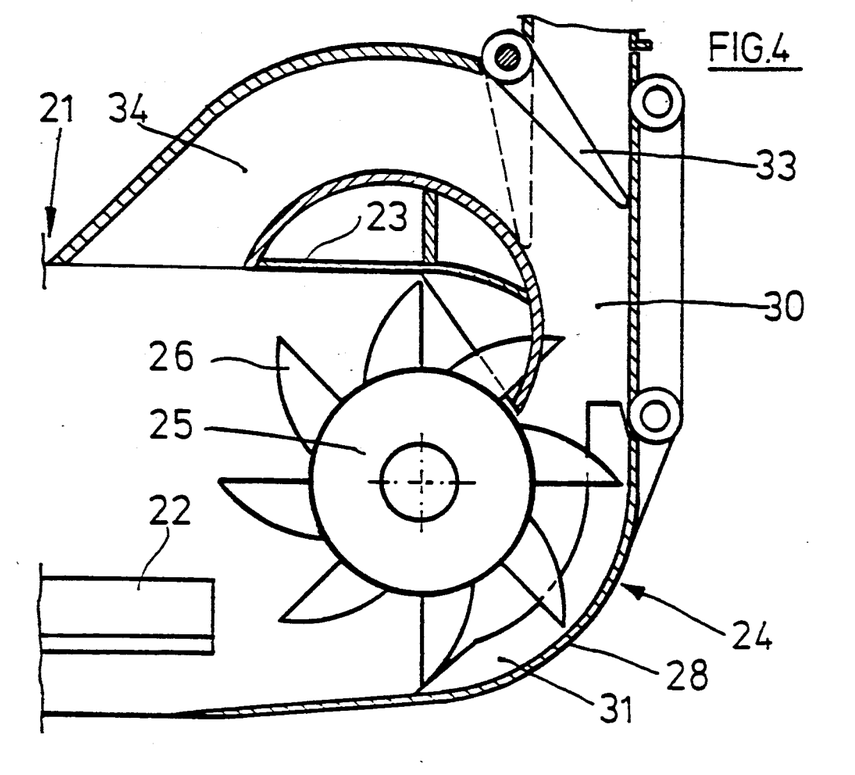
FIG. 4 is a view similar to that of FIG. 3 showing a spreading device for the modified device.

FIG. 4 illustrates a slightly modified embodiment as compared with FIG. 3 with a separate deflecting channel 34 being opened for material feeding when a lid-type deflecting element 33 is switched or moved from the position shown in dashed lines in FIG. 4 to a position closing the outlet of the pressing channel 30. With this embodiment the comminuted and compacted material will not be urged through the strip-off element 29; thus, a somewhat coarser comminuting will be achieved only, which, however, is fully sufficient for mulching dry leafage or grass. On the other hand, this will result in a reduction of the necessary driving power. With the position of the deflecting element 33 shown in full lines the compacted material is fed through the deflecting channel 34 in the upper region of the housing 23 for the mowing device 21 where it enters the airstream caused by the rotating knives or tools 22 and is spread or distribuded by them uniformly over the operating width of the mowing device 21.

Figure 5:
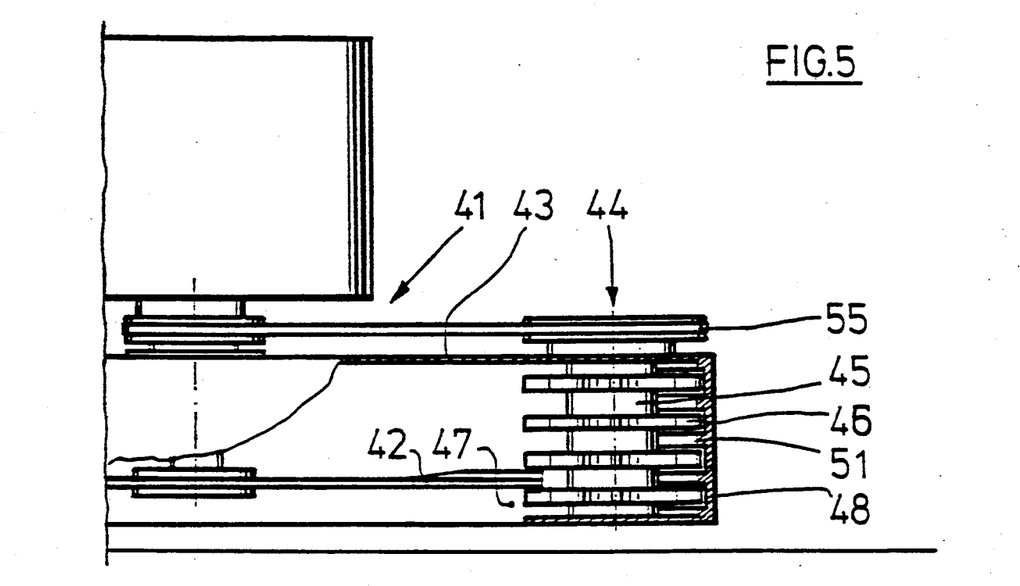
FIG. 5 is a schematic elevational view of a second embodiment of the apparatus according to the invention modified as compared with FIG. 1 in respect of the comminuting and compacting device.
Figure 6:
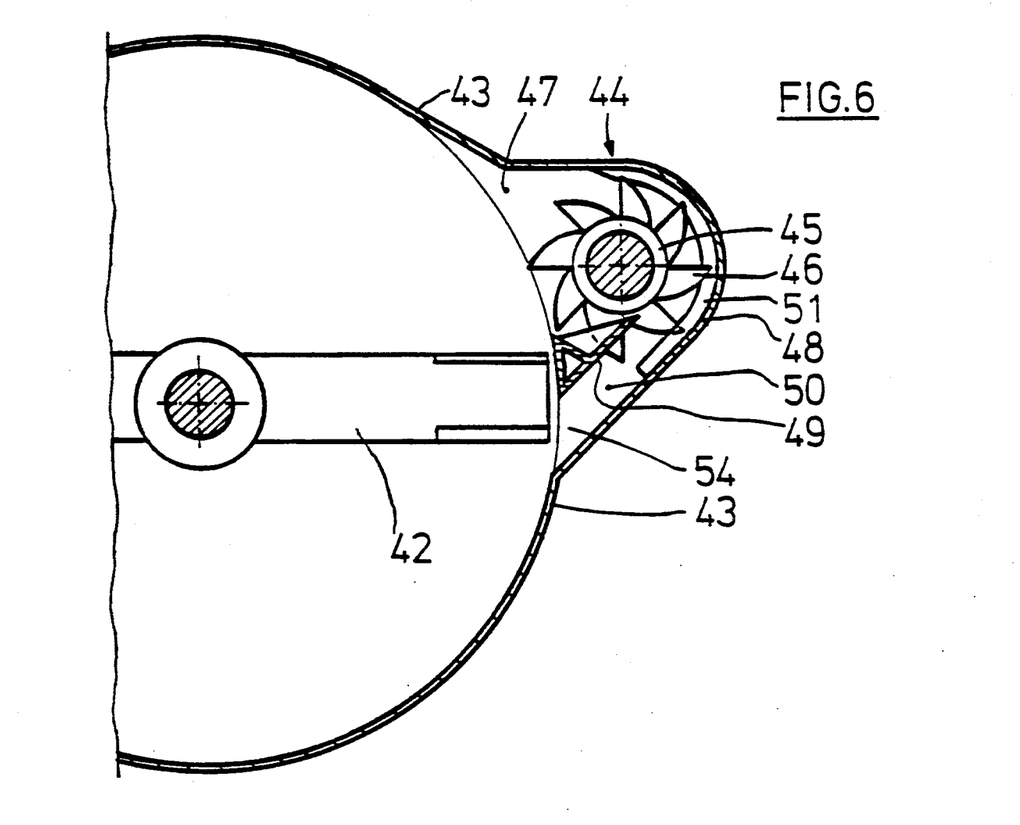
FIG. 6 is a plan view of the apparatus of FIG. 5.

FIGS. 5 and 6 illustrate a further embodiment of the apparatus according to the invention comprising a mowing device 41 similar to that of the mowing device 1 of FIG. 1. As a modification of the apparatus of FIG. 1, for the present embodiment a comminuting and compacting device 44 is arranged with a tine rotor 45 rotating about a vertical axis resulting in a simplified drive in view of the various driving shafts being parallel to each other. The material thrown off by a rotating tool 42 passes through an entering region 47 into the region of tines 46 of the tine rotor 45. On its further way it will be chopped and smashed at the grooves 51 of the pressing wall 48 and is compacted in a pressing channel 50 connected thereto. It should be noted that for comminuting and smashing of dry grass or leafage the grooves 51 are not necessary as the engagement of arc-shaped tines 46 with the surrounding pressing wall 48 is sufficient for high compacting. The pressing channel 50 is continued by a deflecting channel 54 feeding back the compacted material into a housing 43 of the mowing device 41 with the rotating tools 42 seizing the material and distributing it uniformly in accordance with the operating width of the mowing device the almost powderized material dropping onto the clipped lawn and the ground.

FIGS. 7 to 9 illustrate a further embodiment of the apparatus according to the invention comprising a mowing device 61 having at least one mowing tool 62 rotating in a housing 63. In the rear there is provided a comminuting and compacting device 64 essentially comprising a tine rotor 65 having arc-shaped tines 66. The mown material is fed through an entering region 67 by means of the rigid tines 66 into the grooves 71 of a pressing wall 68 with the material being heavily comminuted and compacted. The compacted material is stripped off at a comb-type strip-off element 69 and is fed through a pressing channel 70 into a container 72. At the bottom side of the pressing channel 70 a lid-type deflecting element 73 is provided which in FIG. 7 flushes with the wall of the pressing channel 70 such that all of the comminuted and compacted material is fed and pressed to the container 72.

FIG. 8 shows a different operating position with the deflecting element 73 being pivoted such that it blocks the pressing channel 70 halfway whereby the material compacted in the comminuting and compacting device 64 is partially, i.e. in the present operation position by 50%, fed into the container 72 whilst the other part is deflected into a deflecting channel 74 in the housing 63 to be fed back onto the rotating mowing tools 62. Thus, the deflected material is uniformly distributed by the rotating tools 62 of the operating width of the mown lawn with a lateral spreading being limited by the housing 63.

FIG. 9 shows a third operating position of the deflecting lid 73 where the pressing channel 70 is essentially closed such that no material will be fed into the container 72 but all the comminuted and compacted material is fed back through the deflecting channel 74 to the rotating mowing tools 62 functioning as a distributing means.

As shown at the left-hand side of FIGS. 7 to 9, the selection of the proper operating position may be made depending on the momentary situation. With a high grass (FIG. 7) it may be preferred to guide all clipped material into the container 72 whilst with a very low grass (FIG. 9) all of the material may be fed back into the mowing device and spread thereby for mulching.

Figure 10:
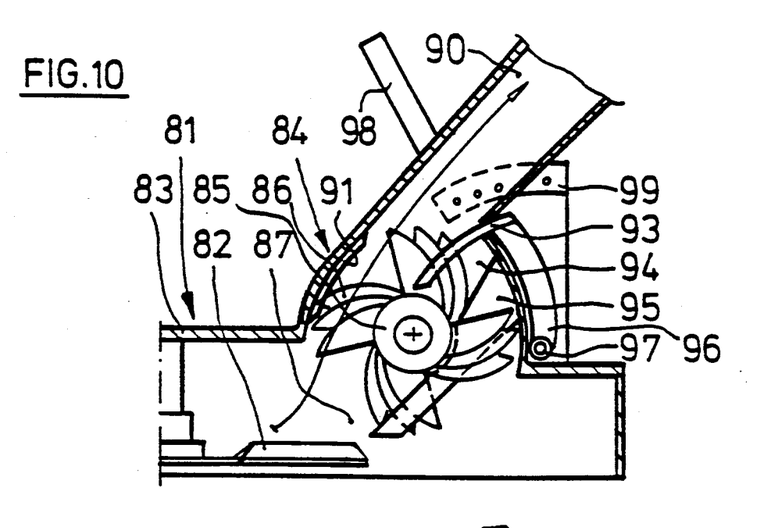
FIG. 10 is an enlarged view of a comminuting and compacting device having a modified material guidance.

FIGS. 10 and 11 illustrate again a section of a still further embodiment of the apparatus according to the invention comprising a mowing device 81 having rotating tools 82 arranged in a housing 83. In contrast to the rotating direction of the tine rotors of the preceding embodiments, with the present embodiment a comminuting and compacting device 84 rotates clockwise with the grooves 91 being provided at the upper side of the pressing wall leading to a pressing channel 90. In order to enhance taking up of the clipped material from an entering region 87 knife-type strip-off elements 95 reach close to the rotating plane of the tools 82. Rigid tines 86 of a tine rotor 85 pass through a comb-type deflecting element 93 closing in the position illustrated in FIG. 10 the entrance to a deflecting channel 94. The deflecting element 93 is connected to a lever 96 pivotable about an axis 97 by means of a setting lever 98 and fixable at an element 99 having several rest positions.

Figure 11:
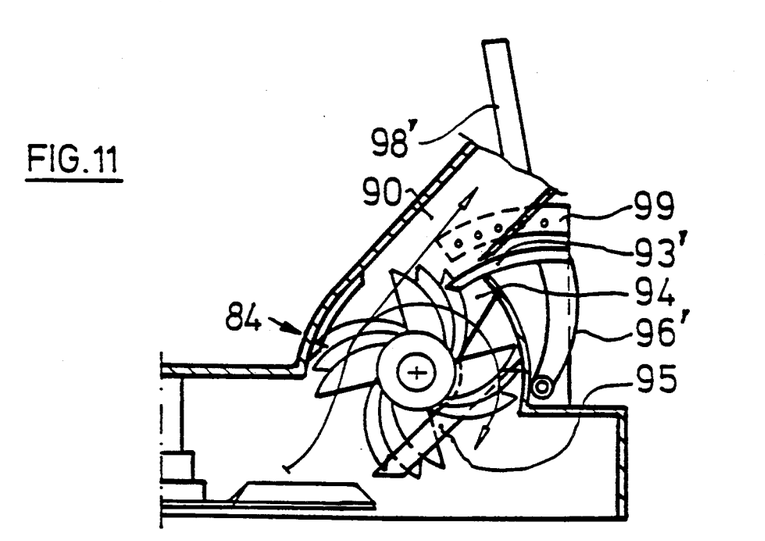
FIG. 11 is a view similar to that of FIG. 10 with the apparatus in a modified operating position.

FIG. 11 illustrates a different angular position 98' of the setting lever 98. In this situation, the pivoted deflecting element 93' at least partially opens the access to the deflecting channel 94 such that a considerable portion of the material comminuted by the tine rotor 85 is fed through the deflecting channel 94 whilst a smaller part thereof passes the pressing channel 90 and may be fed to a container (not shown). Depending on the height of the lawn the partial streams of material represented by the arrows may be determined by a corresponding setting of the setting lever 98 and fixing thereof at the element 99. Again, the material fed back through the deflecting channel 94 drops from the above onto the rotating tools 82 functioning as spreading device in order to uniformly distribute the heavily comminuted material over the operating width. With this embodiment it is of importance that by meshing of the tines 86 with the strip-off element 95 the material is further comminuted and chopped such that it drops onto the spreading device in an almost powderized form.

Figure 12:
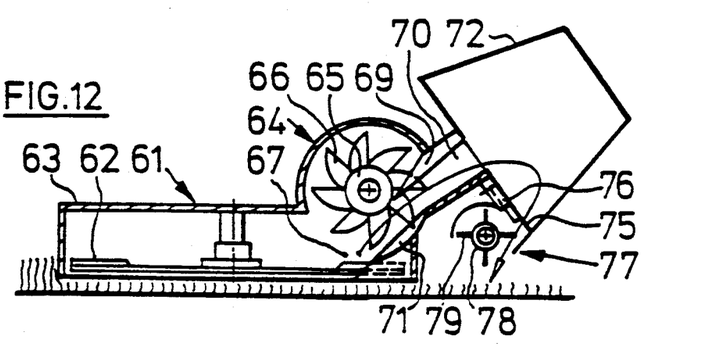
FIG. 12 is a schematic view of a third embodiment of the apparatus according to the invention as a modification of the apparatus according to FIGS. 7 to 9.

FIG. 12 shows an embodiment similar to that of FIGS. 7 to 9 with a mowing device 61 and a comminuting and compacting device 64. However, the deflecting element 73 and the deflecting channel 74 are replaced with this embodiment by a separately driven spreading drum 77, with the comminuted and compacted material first being wholly collected into the container 72 with high densification. Depending on the collected quantity of material and the condition of the ground the material is then spreaded on the ground by the spreading drum 77 partially or in toto over the operating width B. For this purpose, the container 72 is provided with an outlet 75 with its cross-section being adjustable by a slide 76. The spreading drum 77 comprises essentially a rotor 78 with tines 79 provided thereon. With this embodiment it is again possible to continuously adjust the ratio of the material to be collected to the material to be mulched. In the position shown in FIG. 12, slide 76 only partially opens outlet 75 such that only part of the collected material is spread on the ground and mulched there.

Figure 13:
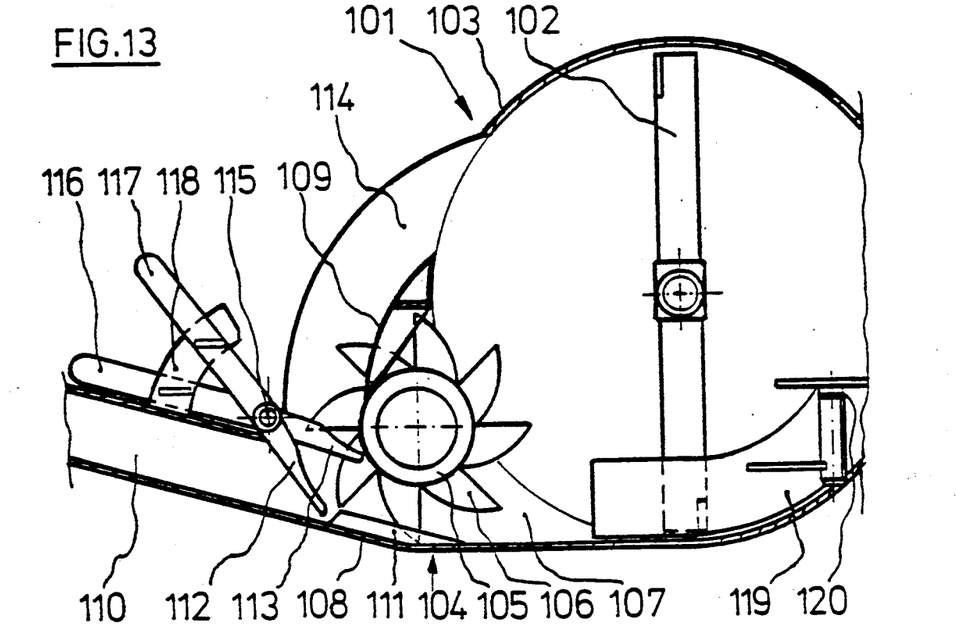
FIG. 13 is a plan view onto a further modification of the comminuting and compacting device.

FIG. 13 illustrates a still further embodiment of the apparatus according to the invention comprising a mowing device 101 having mowing tools 102 rotating in a housing 103. The design of a comminuting and compacting device 104 including a tine rotor 105, tines 106, entering region 107, pressing wall 108, strip-off element 109, pressing channel 110, and grooves 111, corresponds essentially to the embodiment according to FIGS. 5 and 6. Instead of arranging the described deflecting elements for splitting the material stream directly after the comminuting and compacting device with this embodiment the comminuting and pressing device comprises several similar units with each unit being designed such that it may selectively be used for collecting into a container or spreading of material on the ground. Thus, each unit may be used both for a compacting operation and a spreading operation with the advantage that the deflecting channels necessary for passing the material into a collecting container or into a spreading device may be optimized. Accordingly, two deflecting elements 112 and 113 are provided adjustable independently from each other for collecting operation or deflecting operation. For this purpose, the deflecting elements 112, 113 are pivotable about a common axis 115 by associated adjusting levers 116 and 117 at a resting element independently from each other. The upper deflecting element 112 closes the pressing channel 110 being doubled by inserting a separating wall 110a whilst the lower deflecting element 113 closes a deflecting channel 114 thus giving access to the low pressing channel 110. Therefore, in the position shown, about half of the clipped, comminuted, and compacted material is fed back through the deflecting channel 114 onto the mowing device 101 whilst the other half is fed to a container through the lower pressing channel 110. If no mulching is desired, deflecting element 112 may be brought into the position shown for the deflecting element 113 opening the upper pressing channel 110 as well whilst the deflecting channel 114 is closed, whereby all the material is collected. By setting the deflection elements 112 and 113 into intermediate positions any desired ratio between the collected and fed back (and mulched) material may be achieved.

Figure 14:
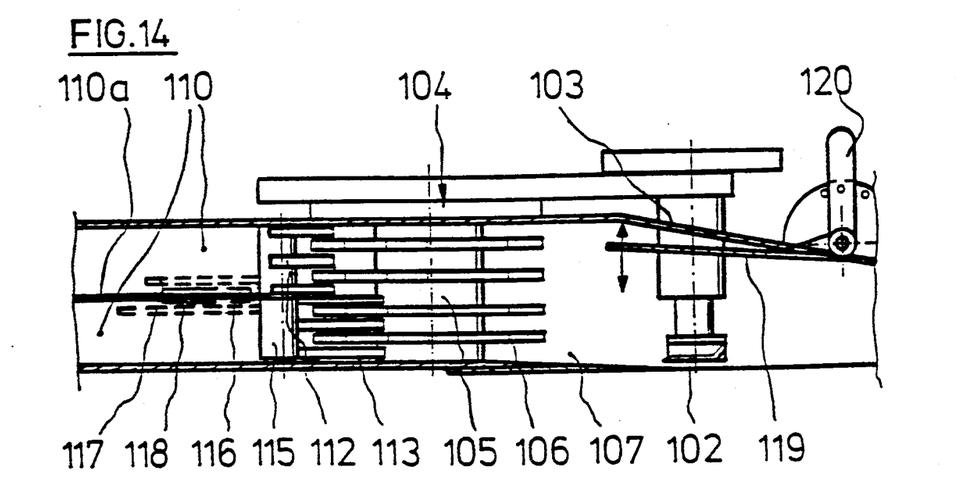
FIG. 14 is an elevational view of the device of FIG. 13.

For a finer adjustment of the ratio between collected and fed back compacted material the feeding of material to the comminuting and compacting device 104 may be adjusted by a guiding device 119 pivotable in respect of height by a pivoting lever 120. Thus, material thrown off from the rotating tools 102 is fed to the whole tine rotor 105 in the highest position whilst in the lowest position the material will be supplied through the entering region 107 to the lower portion of the tine rotor 105 only. In the position shown, the material would be fed primarily to the lower pressing channel 110 such that the majority of the material would be collected. The guiding device 119 may be set and fixed by the setting lever 120 to several setting positions such that the ratio between collection and mulching may be optimized.

Figure 15:
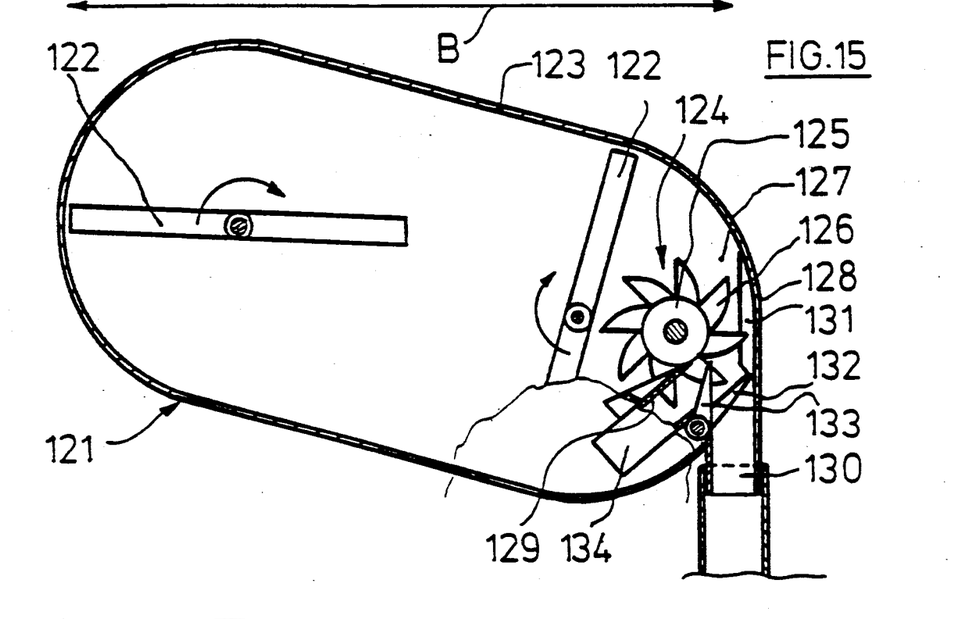
FIG. 15 is a plan view of a comminuting and compacting device modified in respect of FIG. 13.

FIG. 15 illustrates a still further embodiment of the apparatus of the invention using as a mowing device 121 a double sickle mower comprising two rotating tools 122 and a laterally arranged comminuting and compacting device 144. Through an entering region 127 material is supplied to a tine rotor 125 passing this material partially into a pressing channel 130 connected to a container and to a deflecting channel 134 into the housing 123. For selectively closing the pressing channel 130 and/or the deflecting channel 134 two lid-type deflecting elements 132 and 133 are provided. Material fed back through the deflecting channel 134 into the housing 123 is evenly distributed by the two rotating tools 122 over the operating width B.

Figure 16:
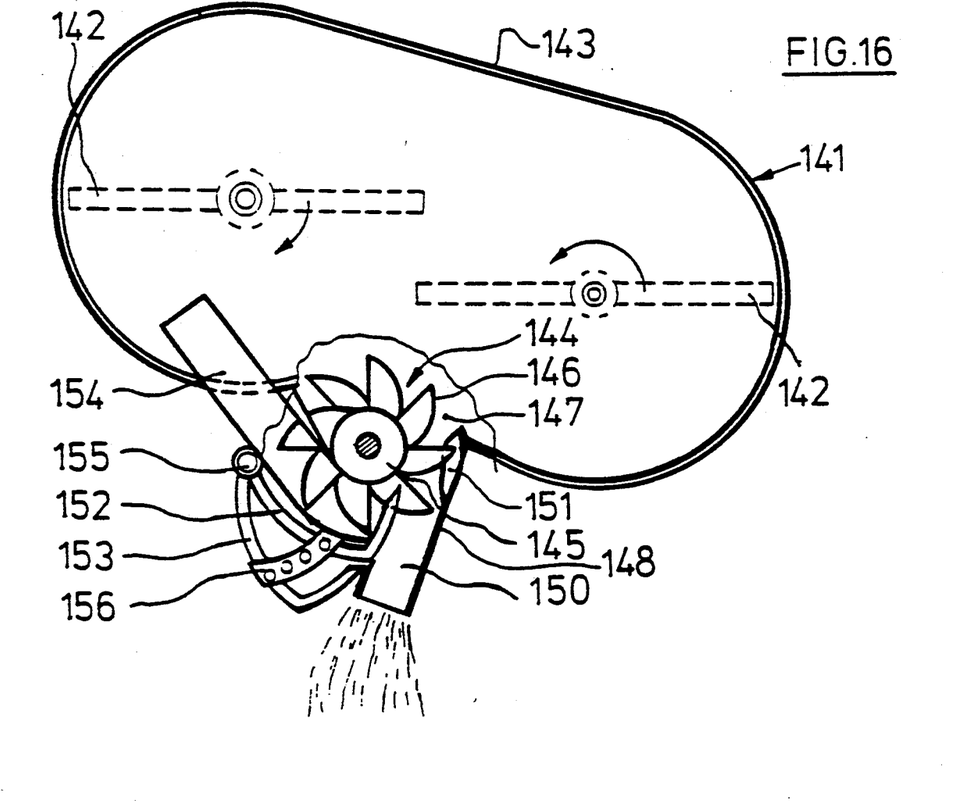
FIG. 16 is a plan view of the comminuting and compacting device further modified in respect of FIG. 13.

FIG. 16 shows a modification of the embodiment of FIG. 15 with the comminuting and compacting device 144 being centrally arranged between the two rotating mowing tools 142 of a mowing device 141. A pressing channel 150 leads to a container (not shown) and may selectively serve for a subsequent collecting of excessive material not to be mulched, for example by a rake device for a swath or row deposition. A deflecting channel 154 opened by an arc-type comb 153 is arranged for feeding back of material into a housing 143 for spreading the material by means of the mowing tools 142. The deflecting elements 152 and 153 are arranged angularly with a radius about a pivoting bearing 155 and may selectively be fixed at a resting element 156.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A method of mulching grass, leafage or similar material with a unitary apparatus, comprising the steps of:
   cutting and collecting said material;
   simultaneously comminuting, compacting, and conveying said material; and
   broadly spreading said material essentially uniformly.

2. The method of claim 1, comprising the step of compressing said material prior to spreading thereof.

3. The method of claim 1, further comprising the step of feeding back at least part of said material to a mowing/collecting device of said apparatus for being spread out thereby.

4. The method of claim 2, further comprising the step of feeding back at least part of said material to a mowing/collecting device of said apparatus for being spread out thereby.

5. The method of claim 3, further comprising the step of dividing said material in two partial streams of material one being fed back to said mowing/collecting device whilst the other being fed under compressing thereof to a container.

6. The method of claim 5, wherein the ratio between the one and the other of said partial material streams is adjustable.

7. The method of claim 1, wherein all of said material is first conveyed under compressing thereof into a container and then spread out in an adjustable quantity.

8. An apparatus for mulching grass, leafage, or similar material, comprising:
   a mowing/collecting means having mowing/collecting members rotatable about an axis;
   a combined comminuting, compacting, and conveying means including a tine rotor means having rigid tines engaging a pressing wall arranged in opposition thereto; and
   spreading means connected to an outlet of said combined comminuting, compacting, and conveying means for loosely, broadly, and essentially uniformly spreading said material.

9. The apparatus of claim 8, wherein said spreading means is a conically expanding knee means having a steeply ascending portion connected to said combined comminuting, compacting and conveying means and a downward-directed outlet portion for loosely spreading said material.

10. The apparatus of claim 8, wherein said spreading means is adapted to spread said material essentially about an operating width of said mowing/collecting means.

11. The apparatus of claim 8, wherein said spreading means is formed by said rotatable mowing/collecting members of said mowing/collecting means, and further comprising deflecting channel means for feeding back said material from said combined comminuting, compacting, and conveying means to said mowing/collecting means.

12. The apparatus of claim 11, wherein there is provided at least one deflection element for selectively deflecting said material into said deflecting channel means or into a container via a pressing channel for further compacting said material.

13. The apparatus of claim 12, wherein at least two of said deflection elements are provided associated to a portion each of said combined comminuting, compacting, and conveying means and adapted to selectively route said material into at least one of a plurality of pressing channels or said deflecting channel means.

14. The apparatus of claim 8, wherein said pressing wall is provided with grooves engaged by said tines of said tine rotor means during rotation thereof.

15. The apparatus of claim 11, wherein said deflecting channel means opens into a housing of said mowing/collecting means from the above.

16. The apparatus of claim 8, wherein said spreading means is connected to an outlet of a collecting container filled through a pressing channel by said combined comminuting, compacting, and conveying means.

17. The apparatus of claim 12, further comprising means for selectively adjusting the ratio between a portion of said material fed back and a portion of said material fed to said container.

18. The apparatus of claim 8, wherein said combined comminuting, compacting, and conveying means further comprises a comb-like strip-off member arranged for meshing with said tines of said tine rotor means.

19. The apparatus of claim 12, wherein said at least one deflection element has a comb-type form arranged for meshing with said tines of said tine rotor means.

20. The apparatus of claim 19, wherein said at least one deflection element is pivotally mounted for gradual adjustment of the extent of meshing between said at least one deflection element and said tines of said tine rotor means.

21. The apparatus of claim 20, wherein said at least one deflection element is arranged to at least partially strip off said material from said tines of said tine rotor means.

22. The apparatus of claim 16, wherein said spreading means is a rotating drum arranged at said outlet of said collecting container.

* * * * *